(12) United States Patent
Pinarbasi

(10) Patent No.: US 7,200,919 B2
(45) Date of Patent: Apr. 10, 2007

(54) METHOD OF FABRICATING A MAGNETIC TRANSDUCER WITH MULTILAYER CONDUCTIVE LEADS INCLUDING A TANTALUM LAYER, A CHROMIUM LAYER AND A RHODIUM LAYER

(75) Inventor: Mustafa Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 348 days.

(21) Appl. No.: 10/609,046

(22) Filed: Jun. 27, 2003

(65) Prior Publication Data

US 2004/0004788 A1    Jan. 8, 2004

Related U.S. Application Data

(62) Division of application No. 09/728,731, filed on Nov. 30, 2000, now Pat. No. 6,813,121.

(51) Int. Cl.
*G11B 5/127* (2006.01)
*H01R 9/10* (2006.01)
*H05K 3/10* (2006.01)

(52) U.S. Cl. .............. 29/603.14; 29/603.07; 29/603.13; 29/842; 29/846; 252/514

(58) Field of Classification Search ............ 29/603.07, 29/846, 831, 603.13, 603.14, 842; 360/322; 252/514
See application file for complete search history.

(56) References Cited

U.S. PATENT DOCUMENTS 3,484,284 A * 12/1969 Eaton et al. ............ 252/514 X

| | | |
|---|---|---|
| 5,438,470 A | 8/1995 | Ravipati et al. |
| 5,491,600 A | 2/1996 | Chen et al. |
| 5,742,459 A | 4/1998 | Shen et al. |
| 5,883,764 A | 3/1999 | Pinarbasi |
| 5,936,810 A | 8/1999 | Nakamoto et al. |
| 5,991,125 A | 11/1999 | Iwasaki et al. |
| 6,086,727 A | 7/2000 | Pinarbasi |
| 6,128,167 A | 10/2000 | Saito et al. |

FOREIGN PATENT DOCUMENTS

| EP | 0 552890A2 A2 | 7/1993 |
|---|---|---|
| JP | 05-258246 A1 | 9/1992 |

OTHER PUBLICATIONS

Veloso et al., "Spin Valve Heads with a Corrosioin Resistant MnRh Exchange Layer", IEEE Transactions on Magnetics, vol. 34, No. 4, Jul. 1998, pp. 2343-2347.*

* cited by examiner

Primary Examiner—A. Dexter Tugbang
(74) Attorney, Agent, or Firm—G. Marlin Knight

(57) ABSTRACT

A method of fabricating a magnetic transducer (head) according to the invention includes forming multilayered electrically conductive leads for the magnetic sensor which include a thin tantalum seed layer followed by a thin chromium seed layer which is followed by a thicker rhodium layer. The dual seed layer of the invention significantly improves the conductivity of the rhodium. The Ta/Cr/Rh leads can be used with hard bias structures formed on a PtMn layer without having increased resistance.

17 Claims, 3 Drawing Sheets

METHOD OF FABRICATING A MAGNETIC TRANSDUCER WITH MULTILAYER CONDUCTIVE LEADS INCLUDING A TANTALUM LAYER, A CHROMIUM LAYER AND A RHODIUM LAYER

RELATED APPLICATION

This is a divisional of application Ser. No. 09/728,731 filed on Nov. 30, 2000 which is now U.S. Pat. No. 6,813,121.

FIELD OF THE INVENTION

The invention relates to the field of magnetic transducers (heads) and more particularly to methods, materials and structures used to form conductive leads in the heads.

BACKGROUND OF THE INVENTION

A typical prior art head and disk system is illustrated in FIG. 1. In operation the head 10 is supported by the suspension 13 as it flies above the disk 16. The magnetic transducer, usually called a "head," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. Typically there are two electrical contact pads (not shown) each for the read and write heads 12, 23. Wires or leads 14 are connected to these pads and routed in the suspension 13 to the arm electronics (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

There are several types of read heads 12 including Giant Magnetoresistive (GMR) and tunnel junction. It is important for the two leads (not shown) that provide the electrical connection to the sensor element (not shown) in a magnetoresistive head 12 to be of low resistance, to be consistently manufacturable and to be resistant to formation of shorts during the manufacturing process. Typically leads (not shown) have been made from copper, tungsten, tantalum or gold, but the requirements of heads like spin valves make these traditional simple leads inadequate. To meet the new requirements, leads with a multilayer structure have been proposed. For example, U.S. Pat. No. 5,438,470 to Ravipati, et al., suggest using a thin layer of tantalum under a layer of gold for the leads. Ravipati '470 also teaches that lower resistance leads are obtained by placing the leads in contact with the hard bias layer as well the magnetoresistive sensor. U.S. Pat. No. 5,491,600 to Chen, et al., describes leads with two refractory metal layers sandwiching a highly conductive metal layer. One embodiment is alternating layers of tantalum and gold. In the particular type of head described in Chen '600, the leads from the spin valve sensor layer stack are formed on material used for the hard bias, e.g., CoPtCr. The CoPtCr layer in turn has a Cr underlayer.

U.S. Pat. No. 5,883,764 to Pinarbasi similarly describes a multilayer lead structure, for example, 3.5 nm Ta, 3.5 nm Cr and 75 nm Ta. The hard bias layer is again CoPtCr.

The substrate on which hard bias layers are formed in some head designs is NiO or alumina. Rhodium has been used as a lead material for these heads. Other designs use PtMn as the substrate for the hard bias layer on which the leads must be formed. However, the resistance of rhodium leads is unacceptably increased when the hard bias and lead stack are formed on a PtMn substrate.

SUMMARY OF THE INVENTION

A head according to the invention includes multilayered electrically conductive leads from the magnetic sensor which include a thin tantalum seed layer followed by a thin chromium seed layer which is followed by a thicker rhodium layer. The dual seed layer of the invention significantly improves the conductivity of the rhodium. The Ta/Cr/Rh leads can be used with hard bias structures formed on a PtMn layer without having increased resistance.

DETAILED DESCRIPTION OF THE INVENTION AND THE PREFERRED EMBODIMENTS

Figure 1:
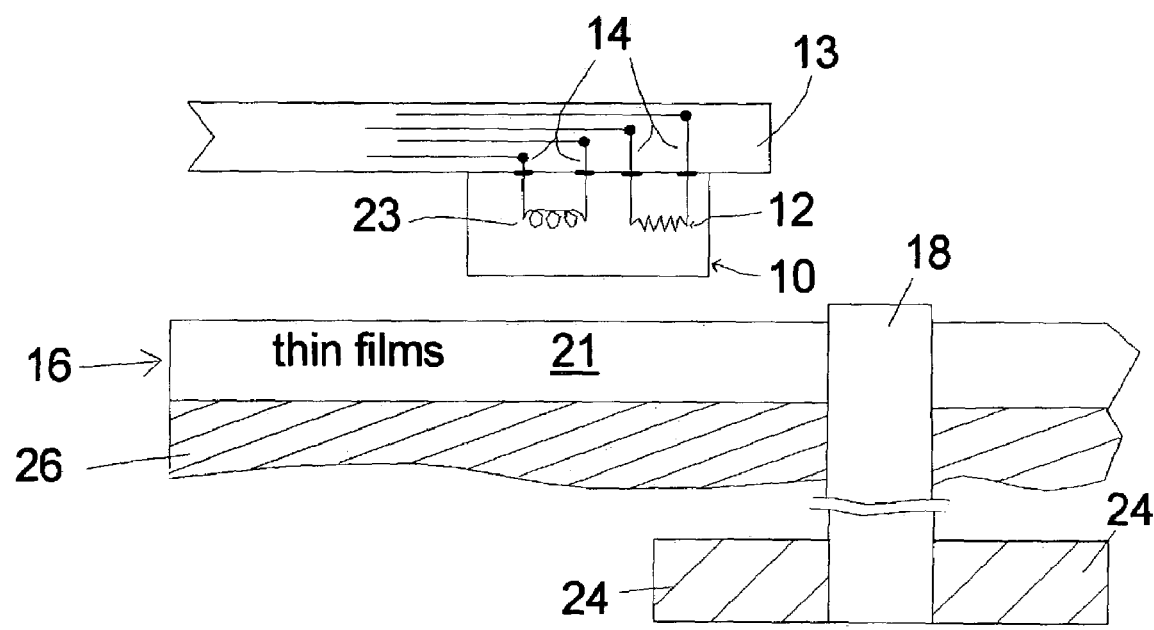
FIG. 1 is an illustration of the prior art showing the relationships between the head and associated components in a disk drive.
Figure 2:
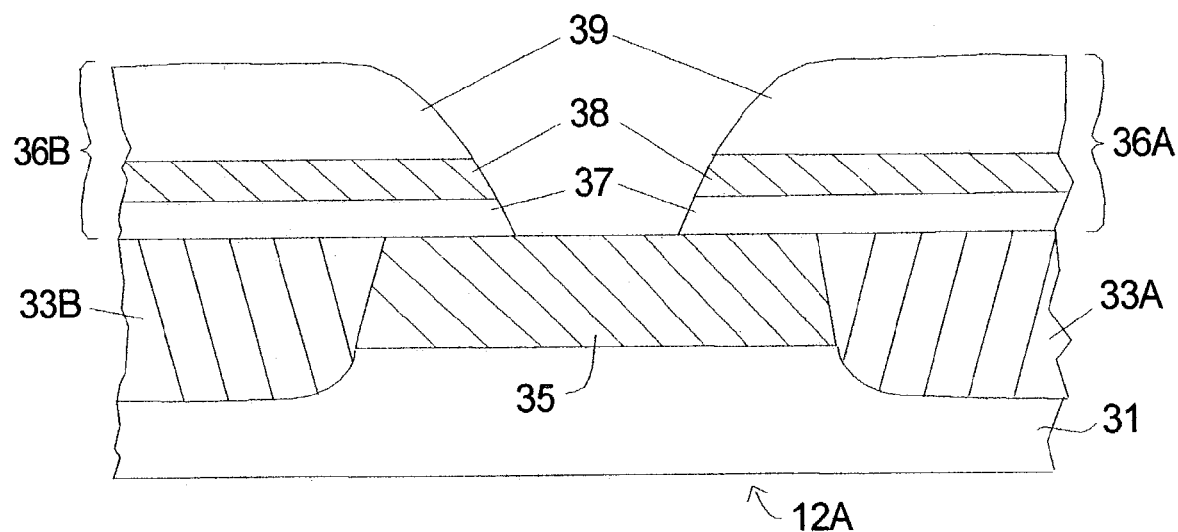
FIG. 2 is an illustration of a section, parallel to the air bearing surface, of a head with the multilayered leads according to the invention overlaid on the hard bias structures and the upper surface of the magnetic sensor.

A first embodiment of the invention in a spin valve head 12A is illustrated in FIG. 2 in a section view taken parallel to the air bearing surface (not shown). The improved conductivity which results from the multilayered lead structure 36A, 36B of the invention can be used in other embodiments as will be clear to those skilled in the art. The relative thickness of the layers are not according to scale to allow the layers to be seen more clearly. The thickness of each layer is according to the prior art with the exceptions noted below. Gap layer 31 underlies the two hard bias structures 33A, 33B. The hard bias structures 33A, 33B are shown as a single element even though they include more than one layer, e.g., a chromium layer (not shown) followed by a CoPtCr layer (not shown). The spin valve 35 is likewise illustrated as a single entity for simplicity even though it includes several layers.

In this embodiment the multilayered leads 36A, 36B are of the so-called overlaid type in that they are deposited in contact with the top surface of the spin valve 35 and the hard bias structures 33A, 33B. The multilayered leads 36A, 36B include the thin tantalum layer 37 which is used as a seed layer deposited directly onto the exposed ends of the top surface the spin valve 35 and the hard bias structures 33A, 33B. As in the prior art the central area of the spin valve 35 will be covered with a protective material such as photoresist (not shown) which is subsequently lifted off. The tantalum layer 37 is deposited by a thin film deposition technique such as sputtering or ion beam deposition. This layer can be very thin, e.g., approximately 3.5 nm, but can also be several times as thick and still perform its function. As with other thin film seed layers, the role of the tantalum layer 37 is to affect the grain size and the crystal orientations of the subsequent layer(s). The next layer after the tantalum layer 37 is a thin film layer of chromium 38. The chromium layer 38 thickness is on the order the tantalum layer 37 and in effect serves as a second seed layer. The chromium layer 38 is also deposited by a thin film deposition technique such as sputtering or ion beam deposition.

The chromium layer 38 is followed by a much thicker layer of rhodium 39. As mentioned above the relative thickness of the layers as shown on FIG. 2 is not according to scale. The rhodium layer 39 is preferably much thicker than the seed layers, e.g., more than ten times thicker. A thickness of 75 nm is a reasonable value. The values of the thickness of the layers of the leads 36A, 36B according to the invention are not critical. The tantalum and chromium layers 37, 38 need only be thick enough to properly establish the growth conditions for the rhodium film 39. The rhodium film 39 needs to be thick enough to provide the conductance needed for the particular magnetic sensor being used.

Figure 3:
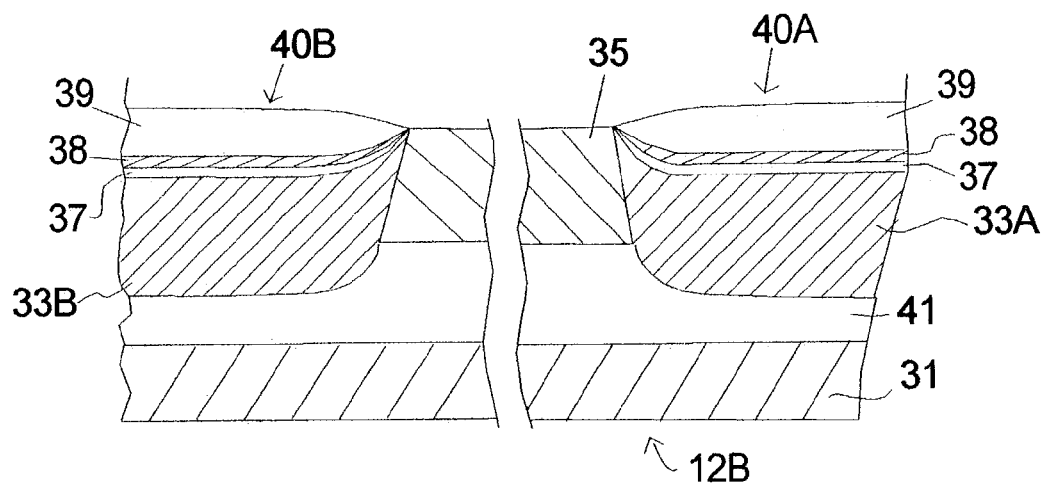
FIG. 3 is an illustration of a section, parallel to the air bearing surface, of a head with the multilayered leads according to the invention formed on the hard bias structures which are formed on a layer of PtMn and with the leads in electrical contact with the magnetic sensor through the hard bias structures.

FIG. 3 is a section parallel to the ABS (not shown) similar to FIG. 2, but the spin valve head 12B illustrated has a so-called semi-contiguous junction (not shown). In this embodiment the hard bias layers 33A, 33B are deposited on a layer of PtMn 41 which is deposited on the gap layer 31. The hard bias layers 33A, 33B do not extend over the entire lateral surfaces of the spin valve 35. The multilayered leads 40A, 40B according to the invention are deposited on top of the hard bias structures 33A, 33B as in the prior art and make electrical contact with the sensor 35 through the hard bias structures 33A, 33B. In contrast to the overlaid leads 36A, 36B of FIG. 2, the leads 40A, 40B in this embodiment do not extend above the spin valve 35.

Figure 4:
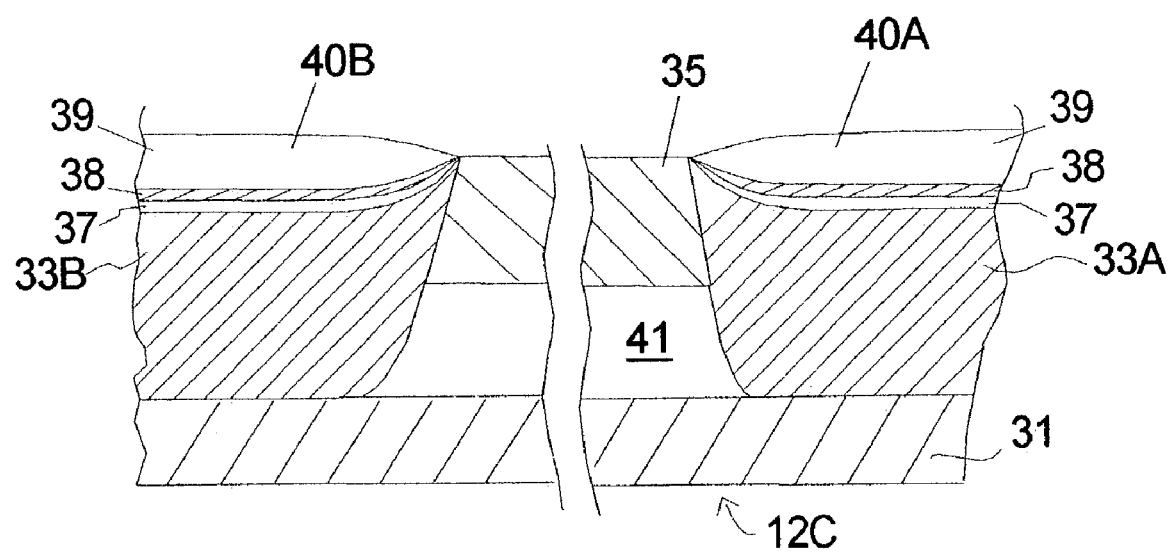
FIG. 4 is an illustration of a section, parallel to the air bearing surface, of a head with the multilayered leads according to the invention formed on the hard bias structures and where the layer of PtMn has been etched away completely from the surface of the gap layer except the area underneath the spin valve.

FIG. 4 illustrates an alternative type of spin valve head 12C in which the multilayered leads 40A, 40B according to the invention can be used. FIG. 4 is a section of a spin valve head 12C similar to that of FIG. 3, but in this head the PtMn layer 41 is etched away completely from the surface of the gap layer 31 except the area underneath the spin valve 35.

As noted above Cr/CoPtCr is used in some prior art heads for the hard bias layers 33A, 33B. In experiments using a Cr/CoPtCr hard bias layer and a 75 nm rhodium conductive layer with varying seed layers, the resistance measurements in ohms/cm$^2$ shown in Table 1 were obtained on bare glass substrates and on glass with 20 nm of PtMn.

TABLE 1

| Seed(s) | Glass | PtMn (20 nm) |
|---------|-------|--------------|
| None    | 1.12  | 1.23         |
| Cr      | 1.11  | 1.25         |
| Ta      | 1.19  | 1.2          |
| Ta/Cr   | 1.04  | 1.05         |

Each seed layer in the experiment was 3.5 nm thick. These values were obtained after 232 C annealing. Neither the Cr seed layer nor the Ta seed significantly affected the resistance in the PtMn case. The dual seed layer of Ta/Cr reduced the resistance by approximately 15%.

It is to be expected that the addition of small amounts of other elements to either the Ta seed layer 37 or the Cr seed layer 38 would produce results that are consistent with those obtained from the pure elements. For example, in the prior art small amounts of vanadium and titanium have successfully been added to thin film chromium underlayers without disrupting the bcc structure. The effect is to modulate the lattice constant. It also follows that the tantalum and chromium seed layers 37, 38 deposited by standard thin film techniques may have a certain amount of contamination and still serve their intended purpose.

Although the embodiments of the invention have been described in a spin valve head environment, the multilayer leads as described herein are not limited to this application. Those skilled in the art will recognize that the multilayered leads of the invention may be used in other magnetic transducer types such as tunnel junctions.

The invention claimed is:

1. A method of fabricating a transducer for reading magnetic transitions from a moving magnetic material comprising the steps of:
    forming a magnetic sensor which is a spin valve; and
    forming first and second leads for the magnetic sensor by:
    fabricating first and second thin film tantalum pads in electrical contact with the magnetic sensor at first and second locations, first and second locations being non-contiguous;
    fabricating thin film chromium pads on first and second tantalum pads; and
    fabricating thin film rhodium pads on the thin film chromium pads.

2. The method of claim 1 further comprising the step, executed before the step of forming the magnetic sensor, of structure of PtMn in a selected area where the magnetic sensor will be formed so that the structure of PtMn will be under the magnetic sensor.

3. The method of claim 2 further comprising the step, executed before the step of fabricating the first and second thin film tantalum pads, of forming first and second hard bias structures on first and second sides of the structure of PtMn and in electrical contact with opposing lateral surfaces of the magnetic sensor, the thin film tantalum pads being deposited in electrical and physical contact with the first and second hard bias structures.

4. The method of claim 3 the step of forming first and second hard bias structures further comprising depositing a layer of chromium followed by a layer of CoPtCr.

5. The method of claim 3 wherein first and second hard bias structures further comprise an upper layer of CoPtCr which is respectively in contact with the thin film layer of tantalum in first and second leads.

6. The method of claim 1 wherein the first and second locations are on opposing areas of an upper surface of the magnetic sensor and wherein the first and second tantalum pads are in physical contact with the upper surface of the magnetic sensor.

7. The method of claim 1 further comprising the step of forming first and second hard bias structures disposed on opposing sides of the magnetic sensor and wherein first and second leads are respectively overlaid on first and second hard bias structures and first and second leads extend onto an upper surface of the magnetic sensor and are in physical contact with the upper surface of the magnetic sensor.

8. The method of claim 3 wherein the first and second thin film tantalum pads have a first thickness and the step of fabricating the thin film rhodium pads further comprises depositing the rhodium to a second thickness, the second thickness being greater than ten times the first thickness.

9. The method of claim 1 further comprising the step of fabricating first and second hard bias structures disposed on opposing lateral surfaces of the magnetic sensor, and wherein the step of fabricating the first and second thin film tantalum pads further comprises forming the first and second tantalum pads on top of the first and second hard bias structures so that the first and second tantalum pads electrically contact the magnetic sensor through the first and second hard bias structures and an upper surface of the magnetic sensor being free from physical contact with the tantalum pads.

10. The method of claim 9 further comprising the step of fabricating a structure of PtMn before forming the magnetic sensor and the step of forming the magnetic sensor further comprising positioning the magnetic sensor on the structure of PtMn.

11. The method of claim 10 wherein the step of forming the first and second hard bias structures further comprises forming the first and second hard bias structures in contact with first and second lateral surfaces of the structure of PtMn.

12. A method of fabricating magnetic transducer comprising the steps of:
  depositing a layer of PtMn on a gap layer;
  forming a magnetic sensor on the layer of PtMn, the magnetic sensor having first and second lateral surfaces with the layer of PtMn having an exposed area and a covered area that is covered by the magnetic sensor;
  fabricating first and second hard bias structures on the exposed area of the layer of PtMn that are adjacent to the magnetic sensor, the first and second hard bias structures being in contact with first and second lateral surfaces of the magnetic sensor;
  fabricating first and second tantalum pads on top of the first and second hard bias structures so that first and second tantalum pads make electrical contact with the magnetic sensor through the first and second hard bias structures and so that the first and second tantalum pads do not contact an upper surface of the magnetic sensor;
  fabricating first and second chromium pads on top of the first and second tantalum pads so that first and second tantalum pads make electrical contact with the magnetic sensor through the first and second hard bias structures and the first and second tantalum pads and do not contact an upper surface of the magnetic sensor;
  fabricating first and second rhodium pads on top of the first and second chromium pads so that first and second rhodium pads make electrical contact with the magnetic sensor through the first and second hard bias structures and the first and second tantalum pads and the first and second chromium pads and do not contact an upper surface of the magnetic sensor.

13. The method of claim 12 wherein the step of fabricating first and second hard bias structures further comprises depositing CoPtCr to form an upper layer of and second hard bias structures.

14. The method of claim 12 wherein the first and second tantalum pads have a first thickness and the step of fabricating the first and second rhodium pads further comprises depositing the rhodium to a second thickness, the second thickness being greater than ten times the first thickness.

15. A method of fabricating magnetic transducer comprising the steps of:
  depositing a layer of PtMn on a substrate layer;
  forming a magnetic sensor on the layer of PtMn, the magnetic sensor having first and second lateral surfaces with the layer of PtMn having been etched away exposing the substrate layer except under the magnetic sensor;
  fabricating first and second hard bias structures on exposed areas of the substrate layer that are adjacent to the magnetic sensor and the layer of PtMn under the magnetic sensor, the first and second hard bias structures being in contact with first and second lateral surfaces of the magnetic sensor;
  fabricating first and second tantalum pads on top of the first and second hard bias structures so that first and second tantalum pads make electrical contact with the magnetic sensor through the first and second hard bias structures and so that the first and second tantalum pads do not contact an upper surface of the magnetic sensor;
  fabricating first and second chromium pads on top of the first and second tantalum pads so that first and second tantalum pads make electrical contact with the magnetic sensor through the first and second hard bias structures and the first and second tantalum pads and do not contact an upper surface of the magnetic sensor;
  fabricating first and second rhodium pads on top of the first and second chromium pads so that first and second rhodium pads make electrical contact with the magnetic sensor through the first and second hard bias structures and the first and second tantalum pads and the first and second chromium pads and do not contact an upper surface of the magnetic sensor.

16. The method of claim 15 wherein the step of fabricating first and second hard bias structures further comprises depositing CoPtCr to form an upper layer of and second hard bias structures.

17. The method of claim 15 wherein the first and second tantalum pads have a first thickness and the step of fabricating the first and second rhodium pads further comprises depositing the rhodium to a second thickness, the second thickness being greater than ten times the first thickness.

* * * * *